Patented Apr. 15, 1930

1,755,119

UNITED STATES PATENT OFFICE

HENRY JORDAN, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS FOR DYEING REGENERATED CELLULOSE MATERIALS

No Drawing.   Application filed September 11, 1928.   Serial No. 305,330.

This invention relates to a process for dyeing regenerated cellulose materials and the resulting product.

As is well known, the dyeing of regenerated cellulose material, such as rayon and viscose, is a difficult task, as most ordinary cotton dyes will produce uneven dyeings. The surprising discovery has been made that certain disazo dyes will give very level shades on these fibers. This invention therefore relates particularly to processes for dyeing regenerated cellulose material with disazo dyes of the following general formula:—

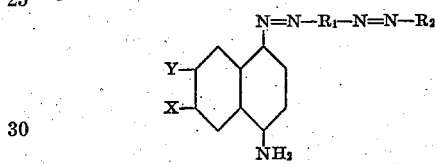

$R_1$ being an aromatic radical, not containing a free hydroxyl- or amino group, $R_2$ being 2-amino-5-naphthol-7-sulphonic acid or an N-substituted derivative thereof, X being a sulpho group or hydrogen, and Y being hydrogen or a sulpho group, there being not more than one sulpho group in the nucleus. The shades obtained vary from violet to blue, especially the blue shades being very valuable for this class of dyes.

By way of illustration the following example is furnished showing a method for applying dyes of this type:

100 parts of rayon (knit or woven material) are circulated in a bath of 4000 parts of water and 2 parts of neutral soap for about 10 minutes at a temperature of 40° C. Then there is added slowly a concentrated solution of one part of the dye

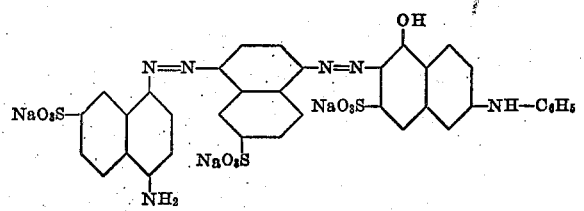

after which the temperature is raised within 20 minutes to 70° C. Then 10% of Glauber's salt (crystals) is added within 15 minutes, maintaining a temperature of 70—80° C. Continue dyeing for about 10 minutes longer, after which the material is rinsed in water and dried. A very even, bright blue shade will be obtained.

The amount of Glauber's salt employed may vary between about 10% to 30% based on the materials to be dyed or it may be substituted by sodium chloride, in which case about 5% to 15% will be required. For heavier dyeings the larger percentage of salt would be advisable.

The neutral soap may be substituted by a soluble oil, as double sulphonated castor oil. The duration of the treatment and temperature of the operation may be varied within wide limits, but the preferred temperatures lie between 40° and 90° C.

The dye employed in the example may, of course, be substituted by a large number of dyes having the general formula indicated above. The table following lists a number of shades obtained by various combinations, to which a large number of similar combinations may be added:—

| | First component | Middle component | End component | Shade |
|---|---|---|---|---|
| (1) | 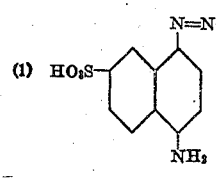 HO$_3$S—[naphthalene with N=N— and NH$_2$] | m-toluidine | 2-amino-5-naphthol-7-sulphonic acid | Violet. |
| (2) | Same | OCH$_3$ / —NH$_2$ (cresidine) / CH$_3$ | Same | Red shade blue. |
| (3) | Same | Same | Phenyl-2-amino-5-naphthol-7-sulphonic acid. | Red shade blue. |
| (4) | Same | 1-naphthylamine | 2-amino-5-naphthol-7-sulphonic acid | Navy blue. |
| (5) | 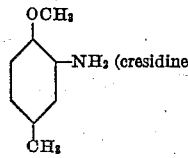 HO$_3$S—[naphthalene with N=N— and NH$_2$] | Same | Same | Navy blue. |
| (6) | 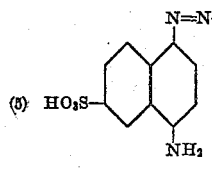 HO$_3$S—[naphthalene with N=N— and NH$_2$] | 1-naphthylamine-6-sulphonic acid | Same | Bright blue |
| (7) | Same | Same | Phenyl-2-amino-5-naphthol-7-sulphonic acid. | Bright blue |
| (8) | Same | SO$_3$H—[naphthalene with NH$_2$ and OC$_2$H$_5$] | Same | Bright, very green shade blue. |

The dyes may be prepared, for instance in case 4, by diazotizing 1-acetyl-amino-4-amino-naphthalene-6-sulphonic acid, coupling the diazo compound to alpha-naphthylamine, diazotizing the amino azo compound again, coupling the diazo azo compound to 2-amino-5-naphthol-7-sulphonic acid, and finally saponifying the dye by boiling with sodium hydroxide. The other dyes may be prepared in a similar way.

As many apparently widely different embodiments of this invention may be made without departing from the spirit and scope thereof, it is to be understood that I do not limit myself to the specific embodiments thereof except as defined in the appended claims.

I claim:

1. The process of coloring regenerated cellulose materials which comprises applying thereto a dye of the formula:

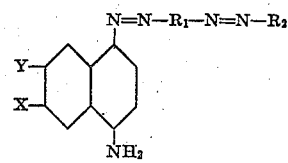

$R_1$ being an aromatic radical, not containing a free hydroxyl- or amino group, $R_2$ being 2-amino-5-naphthol-7-sulphonic acid or an N-substituted derivative thereof, X being a sulpho group or hydrogen, and Y being hydrogen or a sulpho group, there being not more than one sulpho group in the nucleus.

2. The process of coloring regenerated cellulose materials which comprises treating the same with a dye of the formula:

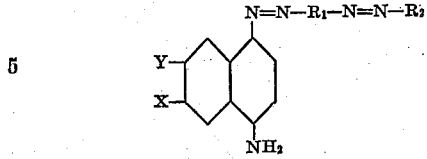

($R_1$ being an aromatic radical, not containing a free hydroxyl- or amino group, $R_2$ being 2-amino-5-naphthol-7-sulphonic acid or an N-substituted derivative thereof, X being a sulpho group or hydrogen, and Y being hydrogen or a sulpho group, there being not more than one sulpho group in the nucleus) in a neutral bath containing a salt of the group consisting of sodium sulphate and sodium chloride.

3. The process of coloring regenerated cellulose materials which comprises treating the same with a dye of the formula:

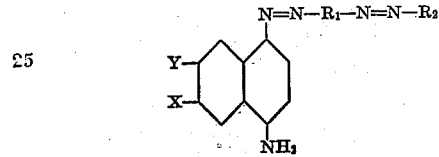

($R_1$ being an aromatic radical, not containing a free hydroxyl- or amino group, $R_2$ being 2-amino-5-naphthol-7-sulphonic acid or an N-substituted derivative thereof, X being a sulpho group or hydrogen, and Y being hydrogen or a sulpho group, there being not more than one sulpho group in the nucleus) in a neutral bath containing from 10 to 30% sodium sulphate (based on the weight of the material to be dyed) and at a temperature between 50° and 90° C.

4. The process of coloring regenerated cellulose materials which comprises applying thereto a dye of the formula:

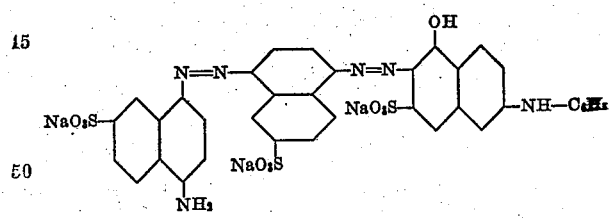

5. A regenerated cellulose material dyed with a dye having the formula:

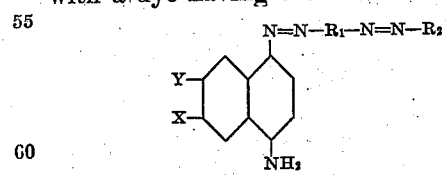

$R_1$ being an aromatic radical, not containing a free hydroxyl- or amino group, $R_2$ being 2-amino-5-naphthol-7-sulphonic acid or an N-substituted derivative thereof, X being a sulpho group or hydrogen, and Y being hydrogen or a sulpho group, there being not more than one sulpho group in the nucleus.

In testimony whereof, I affix my signature.

HENRY JORDAN.